(12) United States Patent
Kanzawa et al.

(10) Patent No.: US 11,882,252 B2
(45) Date of Patent: Jan. 23, 2024

(54) OPENING AND CLOSING DEVICE AND IMAGE FORMING APPARATUS

(71) Applicant: FUJIFILM Business Innovation Corp., Tokyo (JP)

(72) Inventors: Yutaro Kanzawa, Kanagawa (JP); Yoichi Takeuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/700,504

(22) Filed: Mar. 22, 2022

(65) Prior Publication Data
US 2023/0094281 A1 Mar. 30, 2023

(30) Foreign Application Priority Data

Sep. 27, 2021 (JP) ................................. 2021-156401

(51) Int. Cl.
*H04N 1/00* (2006.01)
(52) U.S. Cl.
CPC ..... *H04N 1/00546* (2013.01); *H04N 1/00557* (2013.01); *H04N 1/00559* (2013.01)
(58) Field of Classification Search
None
See application file for complete search history.

(56) References Cited

U.S. PATENT DOCUMENTS

| 6,151,459 | A | * | 11/2000 | Hashimoto | G03G 15/0856 399/12 |
|---|---|---|---|---|---|
| 2008/0025001 | A1 | * | 1/2008 | Igarashi | H05K 5/0217 361/725 |
| 2008/0025749 | A1 | * | 1/2008 | Igarashi | G03G 21/1647 399/92 |
| 2011/0205692 | A1 | * | 8/2011 | Yamamoto | G03G 21/1633 361/600 |
| 2011/0229191 | A1 | * | 9/2011 | Nomi | G03G 21/1633 399/110 |
| 2013/0104345 | A1 | * | 5/2013 | Granberry | E05D 11/06 16/374 |
| 2013/0214663 | A1 | * | 8/2013 | Marzorati | E05D 7/00 16/289 |

(Continued)

FOREIGN PATENT DOCUMENTS

JP H11058887 3/1999
JP 2009091863 4/2009

*Primary Examiner* — Dung D Tran
(74) *Attorney, Agent, or Firm* — JCIPRNET

(57) ABSTRACT

An image forming apparatus includes: a body of the image forming apparatus; an opening and closing unit that is supported by the body of the image forming apparatus so as to rotate relative to the body of the image forming apparatus and that opens and closes an inside of the body of the image forming apparatus, the opening and closing unit having a rotating shaft; a first coupling unit that has a first tube portion and a second coupling unit that has an extension portion a bent portion, and a second tube portion. When the opening and closing unit has been moved to an open position where the opening and closing unit opens the inside of the body of the image forming apparatus, a contact part at which the opening and closing unit is to be in contact with the second coupling unit is in contact with the bent portion.

13 Claims, 5 Drawing Sheets

(56) References Cited

U.S. PATENT DOCUMENTS

| | | | |
|---|---|---|---|
| 2013/0219664 A1* | 8/2013 | Burda | E05D 11/06 |
| | | | 16/374 |
| 2015/0116796 A1* | 4/2015 | Urita | H04N 1/10 |
| | | | 358/497 |
| 2016/0097231 A1* | 4/2016 | Shimizu | H04N 1/00549 |
| | | | 49/306 |
| 2021/0025206 A1* | 1/2021 | Nakamura | E05D 5/06 |
| 2021/0200141 A1* | 7/2021 | Kawaguchi | G03G 15/0863 |

* cited by examiner

OPENING ANGLE 23°

OPENING ANGLE 10°

1002 MPa

534 MPa

OPENING AND CLOSING DEVICE AND IMAGE FORMING APPARATUS

CROSS-REFERENCE TO RELATED APPLICATIONS

This application is based on and claims priority under 35 USC 119 from Japanese Patent Application No. 2021-156401 filed Sep. 27, 2021.

BACKGROUND

(i) Technical Field

The present disclosure relates to an opening and closing device and an image forming apparatus.

(ii) Related Art

In apparatuses such as image forming apparatuses, information processing apparatuses, and electrical appliances, the following techniques, regarding an opening and closing structure having an opening and closing unit that opens and closes the inside of an apparatus, described in Japanese Unexamined Patent Application Publication No. 11-58887 and Japanese Unexamined Patent Application Publication No. 2009-91863 have been known.

Japanese Unexamined Patent Application Publication No. 11-58887 describes a configuration having a covering part (2) and a stopper (12) extending from the covering part (2) (refer to 0010 to 0012, 0018 to 0022, FIG. 1, and FIG. 2). The covering part (2) is stopped, at a predetermined position where the covering part (2) is fully opened, by a plate-shaped protrusion (14) at the distal end of the stopper (12) being stopped by an edge of an arcuately extending groove (13) that is formed in a frame (11) fixed to an apparatus body (1).

Japanese Unexamined Patent Application Publication No. 2009-91863 describes a configuration having a covering part (3) and a fan-shaped stopper member (11) provided on a side surface of the covering part (3) (refer to 0019 to 0022, and FIGS. 2 to 4). The covering part (3) is stopped at a position where the covering part (3) is opened to the maximum, by an opening preventer (14), which is provided on one of both sides of the fan shape of the stopper member (11), coming into contact with a contact pin (9) provided on a side surface of a control box (5).

SUMMARY

Aspects of non-limiting embodiments of the present disclosure relate to, when an opening and closing unit has been moved to an open position, suppressing a load from being exerted on the opening and closing unit and a coupling unit, compared with the case where the opening and closing unit is in contact with an extension portion.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including:
a body of the image forming apparatus;
an opening and closing unit that is supported by the body of the image forming apparatus so as to rotate relative to the body of the image forming apparatus and that opens and closes an inside of the body of the image forming apparatus, the opening and closing unit having a rotating shaft;
a first coupling unit that has a first tube portion having a tube shape and having an inside through which the rotating shaft of the opening and closing unit passes, the first coupling unit being supported by the opening and closing unit; and
a second coupling unit that has an extension portion supported by the body of the image forming apparatus and extending toward the first coupling unit, a bent portion having a first end portion that is connected to an end portion of the extension portion and being formed to be bent relative to an extension direction of the extension portion and to extend toward the rotating shaft, and a second tube portion disposed beside a second end portion of the bent portion and having an inside through which the rotating shaft of the opening and closing unit passes, the second coupling unit being rotatably coupled to the first coupling unit, wherein:
when the opening and closing unit has been moved to an open position where the opening and closing unit opens the inside of the body of the image forming apparatus, a contact part at which the opening and closing unit is to be in contact with the second coupling unit is in contact with the bent portion.

BRIEF DESCRIPTION OF THE DRAWINGS

An exemplary embodiment of the present disclosure will be described in detail based on the following figures, wherein:

FIG. 7A illustrates the stress distribution, in the section illustrated in FIG. 6, of the opening and closing mechanism of the related art, FIG. 7B illustrates an opening angle of the opening and closing mechanism of the related art illustrated in FIG. 6, FIG. 7C illustrates the stress distribution of a body sheet metal of the opening and closing mechanism of the related art illustrated in FIG. 6, FIG. 7D illustrates the stress distribution, in the section illustrated in FIG. 5, of an opening and closing mechanism of Example 1, FIG. 7E illustrates an opening angle of the opening and closing mechanism of Example 1, and FIG. 7F illustrates the stress distribution of a body sheet metal of the opening and closing mechanism of Example 1;

DETAILED DESCRIPTION

Next, a specific example (hereinafter, referred to as an example) of an exemplary embodiment of the present disclosure will be described with reference to the drawings. However, the present disclosure is not limited to the following example.

Note that, for facilitating understanding, illustration of the members other than the members necessary for the description with reference to the drawings will appropriately be omitted from the description.

Example 1

Figure 1:
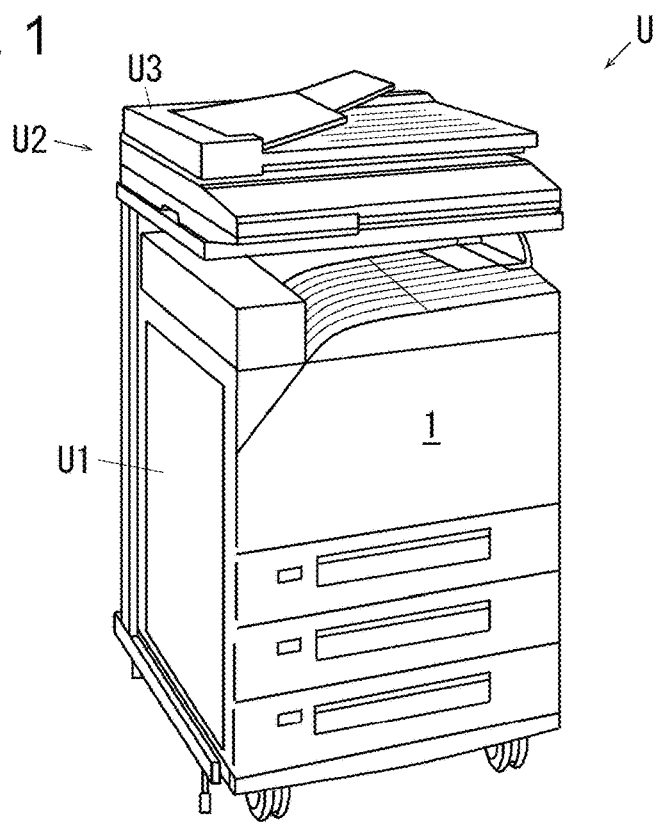
FIG. 1 is an overall view illustrating an image forming apparatus of Example 1.

FIG. 1 is an overall view illustrating an image forming apparatus of Example 1.

Figure 2:
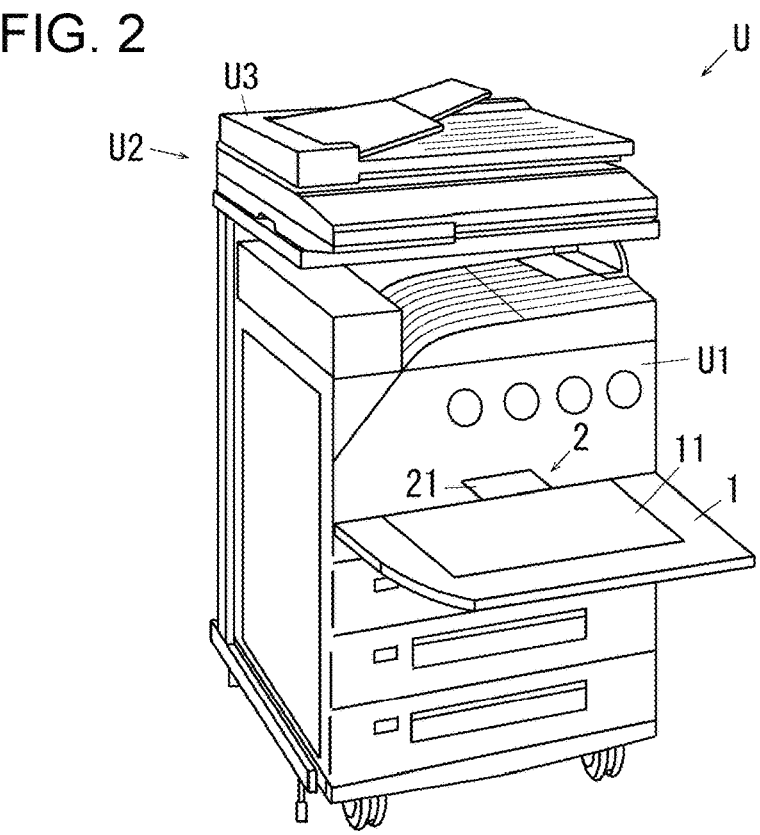
FIG. 2 illustrates the image forming apparatus of Example 1 when an opening and closing unit has been moved to an open position.

FIG. 2 illustrates the image forming apparatus of Example 1 when an opening and closing unit has been moved to an open position.

Figure 3:
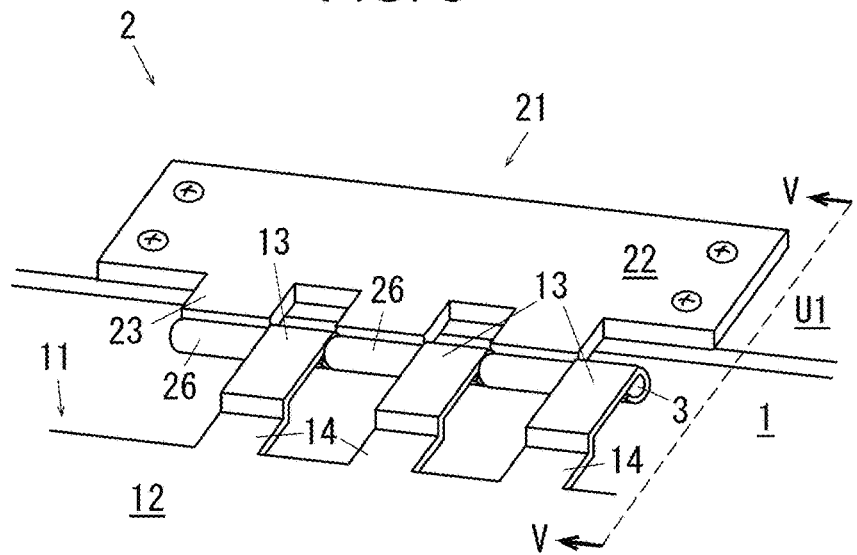
FIG. 3 is an enlarged view of a coupled part of the opening and closing unit when at the open position.

FIG. 3 is an enlarged view of a coupled part of the opening and closing unit when at the open position.

Figure 4:
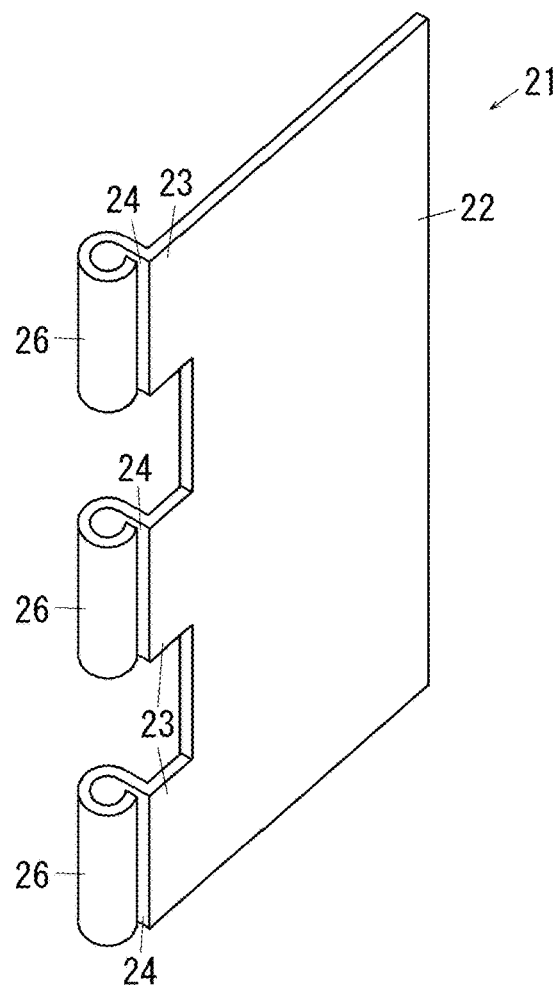
FIG. 4 is a perspective view of a second coupling unit.

FIG. 4 is a perspective view of a second coupling unit.

Figure 5:
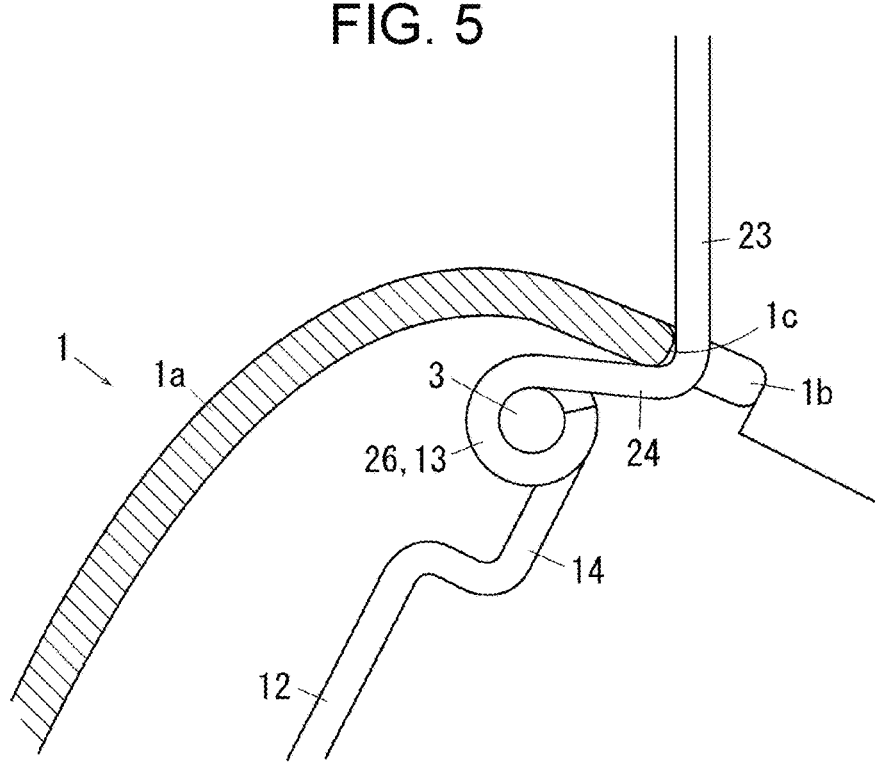
FIG. 5 is a sectional view taken along line V-V of FIG. 3.

FIG. 5 is a sectional view taken along line V-V of FIG. 3.

In FIG. 1, a copier U, which is an example of an image forming apparatus of Example 1 of the present disclosure and is also an example of an opening and closing device, has a printer unit U1, which is an example of an image forming unit. The printer unit U1 supports, on the upper side thereof, a scanner unit U2, which is an example of a reading unit and is also an example of an image reading device. The scanner unit U2 supports, on the upper side thereof, an auto-feeder U3, which is an example of a document transporting device.

In FIGS. 1 and 2, an opening-and-closing covering part 1, which is an example of an opening and closing unit, is disposed at the front of the printer unit U1, which is an example of an opening and closing target unit and is also an example of a body of the image forming apparatus. The opening-and-closing covering part 1 of Example 1 is capable of rotating about a rotating shaft 3 extending horizontally, by using a hinge 2, which is an example of a coupling unit, disposed on the proximal edge side of the opening-and-closing covering part 1. Thus, the opening-and-closing covering part 1 of Example 1 is capable of being opened and closed between a closed position illustrated in FIG. 1 and an open position illustrated in FIG. 2. Note that, in Example 1, a toner cartridge, which is an example of a developer storing unit, is capable of being replaced when the opening-and-closing covering part 1 has been moved to the open position.

In FIG. 5, the opening-and-closing covering part 1 has, in an end portion of an outer wall portion 1a on the hinge 2 side, an opening 1b through which the hinge 2 is capable of passing.

In FIGS. 3 and 5, the opening-and-closing covering part 1 supports, on the inner side thereof, a covering-part sheet metal 11, which is an example of a first coupling unit. The covering-part sheet metal 11 has a body portion 12 having a plate shape and fixed to the inner side of the opening-and-closing covering part 1 by a screw (not illustrated). The body portion 12 has, on the rotating shaft 3 side, a first bearing portion 13, which is an example of a first tube portion. Regarding the first bearing portion 13 of Example 1, three first bearing portions 13 are formed at intervals in the axial direction of the rotating shaft 3. Each of the first bearing portions 13 of Example 1 is formed by an end portion of a bend 14, which is formed by an end portion of the body portion 12 being bent, being processed to be rolled. In Example 1, the first bearing portion 13 is processed to be rolled, from a part thereof beside the bend 14 toward the distal end thereof, in the direction (the counterclockwise direction in FIG. 5) where the opening-and-closing covering part 1 is moved to the closed position.

In FIGS. 3 to 5, the printer unit U1 supports a body sheet metal 21, which is an example of a second coupling unit. A body portion 22 of the body sheet metal 21 is fixed to a frame body (frame) of the printer unit U1, which is not illustrated, by a screw (not illustrated). The body portion 22 has, on the rotating shaft 3 side, an extension portion 23 extending toward the covering-part sheet metal 11. The extension portion 23 has, on the distal end side, a bent portion 24 bent from the extension portion 23 to the rotating shaft 3 side. In Example 1, the bent portion 24 is bent at, for example, 90 degrees relative to the extension portion 23. However, such a bend angle may optionally be changed according to, for example, design and specifications.

The bent portion 24 has, on the distal end side, a second bearing portion 26, which is an example of a second tube portion. Regarding the second bearing portion 26 of Example 1, three second bearing portions 26 are formed at intervals in the axial direction of the rotating shaft 3. In Example 1, regarding the body sheet metal 21, the body portion 22, each extension portion 23, each bent portion 24, and each second bearing portion 26 are formed by a plate-shaped member being bent and rolled.

In Example 1, the second bearing portion 26 is processed to be rolled, from a part thereof beside the bent portion 24 toward the distal end thereof, in a roll direction parallel to the direction (the counterclockwise direction in FIG. 5) where the opening-and-closing covering part 1 is closed. In other words, the second bearing portion 26 is bent, from the part thereof beside the bent portion 24 toward the distal end thereof, in the roll direction reverse to the direction (the clockwise direction in FIG. 5) where the bent portion 24 is bent relative to the extension portion 23. Thus, in Example 1, as FIG. 5 illustrates, the bent portion 24 extends while passing through the space between the rotating shaft 3 and the outer wall portion 1a of the opening-and-closing covering part 1.

The rotating shaft 3 passes through the inside of the first bearing portion 13 and the inside of the second bearing portion 26, and the rotating shaft 3 rotatably couples the covering-part sheet metal 11 and the body sheet metal 21 to one another. The covering-part sheet metal 11, the body sheet metal 21, the rotating shaft 3, and other parts constitute the hinge 2 of Example 1.

In FIG. 5, regarding the body sheet metal 21 of Example 1, for example, the lengths, shapes, and bend angle of the extension portion 23 and the bent portion 24 are determined so that a contact part 1c at which the opening-and-closing covering part 1 is to be in contact with the body sheet metal 21 is, when at the open position, in contact with the bent portion 24. In particular, in Example 1, the contact part 1c is configured so as to come into contact with a boundary part between the bent portion 24 and the extension portion 23. Namely, the contact part 1c comes into contact with the bent portion 24 and the extension portion 23 in a straddling manner, that is, the contact part 1c is configured so as to come into contact with both the bent portion 24 and the extension portion 23.

Note that, in Example 1, as an example, the opening-and-closing covering part 1 is made of a resin material, and the covering-part sheet metal 11 and the body sheet metal 21 are made of steel (an example of a metal material) that is a material more rigid than the material of the opening-and-closing covering part 1.

Actions of Example 1

Figure 6:
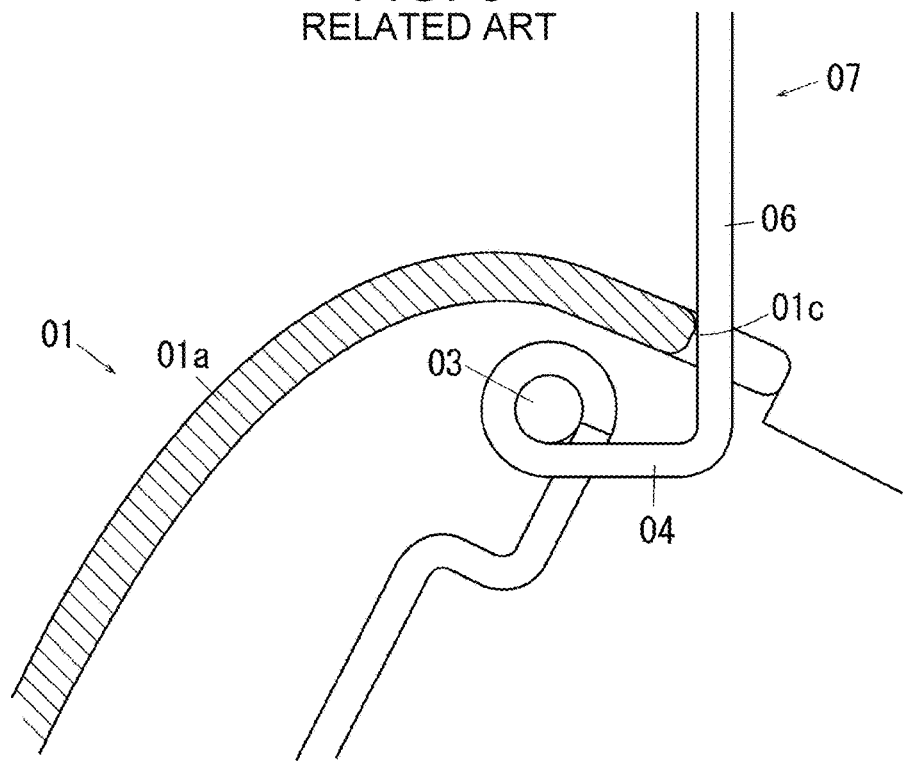
FIG. 6 illustrates an opening and closing mechanism of the related art having a covering part that also has a function of a stopper.

FIG. 6 illustrates an opening and closing mechanism of the related art having a covering part that also has a function of a stopper.

The copier U of Example 1 having the above-described configuration has the opening-and-closing covering part 1 so that, for example, replacement of consumables such as toner cartridges, repair, check, and component replacement are capable of being performed.

In the techniques described in Japanese Unexamined Patent Application Publication No. 11-58887 and Japanese Unexamined Patent Application Publication No. 2009-91863, a frame (11) having an arcuately extending groove (13) and a contact pin (9) provided on the control box (5) side are each used as a configuration for stopping a covering part at the open position, that is, used as a so-called stopper. Thus, in Japanese Unexamined Patent Application Publication No. 11-58887 and Japanese Unexamined Patent Application Publication No. 2009-91863, a component dedicated as a stopper is added. Consequently, there arises a problem that the number of components is increased, and costs are thereby increased. As a configuration without any addition of a component dedicated as a stopper, a configuration in FIG. 6 in which an end portion 01c of an outer wall portion 01a of a covering part 01 also serves as a stopper has been known. As FIG. 6 illustrates, in the adopted configuration of the related art, a bent portion 04 is bent at a position near a rotating shaft 03, and the end portion 01c comes into contact with an extension portion 06 to stop the covering part 01 at the open position.

Figure 7A:
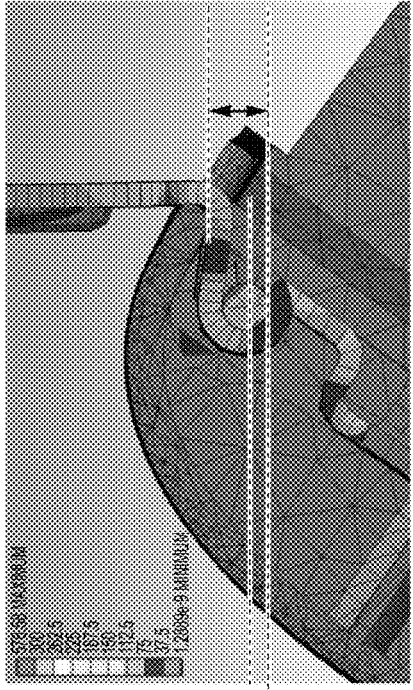
FIGS. 7A to 7F illustrate results of simulations, that is.
Figure 7D:
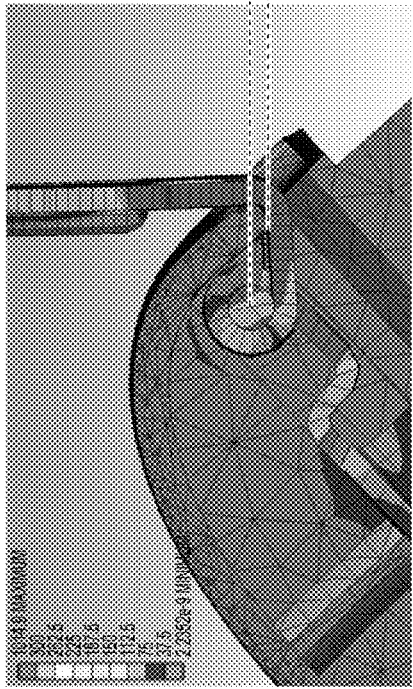
Figure 7B:
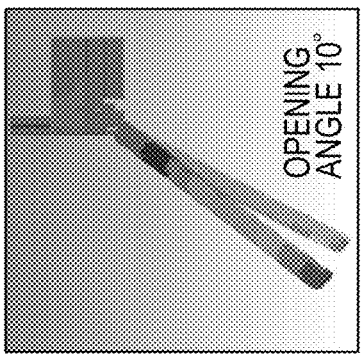
Figure 7E:
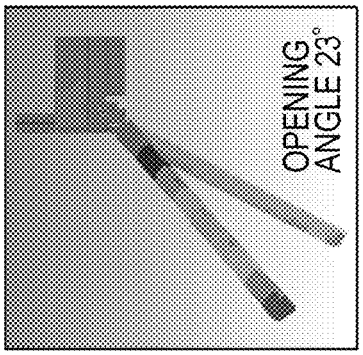
Figure 7C:
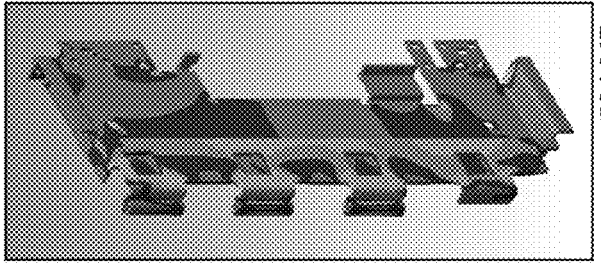
Figure 7F:
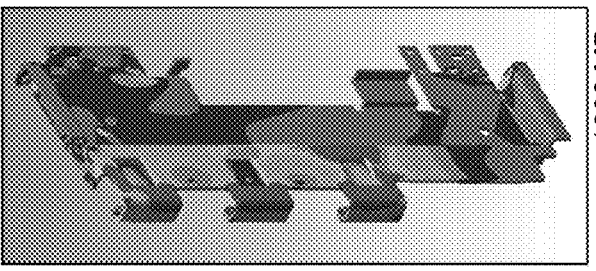

FIGS. 7A to 7F illustrate results of simulations, that is, FIG. 7A illustrates the stress distribution, in the section illustrated in FIG. 6, of the opening and closing mechanism of the related art, FIG. 7B illustrates an opening angle of the opening and closing mechanism of the related art illustrated in FIG. 6, FIG. 7C illustrates the stress distribution of a body sheet metal of the opening and closing mechanism of the related art illustrated in FIG. 6, FIG. 7D illustrates the stress distribution, in the section illustrated in FIG. 5, of an opening and closing mechanism of Example 1, FIG. 7E illustrates an opening angle of the opening and closing mechanism of Example 1, and FIG. 7F illustrates the stress distribution of a body sheet metal of the opening and closing mechanism of Example 1.

Note that the simulations in FIGS. 7A to 7F are performed under the same condition regarding, for example, load to be applied and the rigidity of a material.

In FIGS. 7A to 7C, regarding the configuration illustrated in FIG. 6, when a user continues application of a force even after the end portion 01c has come into contact with the extension portion 06, or when the covering part 01 is vigorously moved to the open position, a part of the covering part 01 on the outer wall portion 01a side, which has low rigidity, is distorted. At this time, the outer wall portion 01a is distorted so that the end portion 01c moves to the bent portion 04 side along the extension portion 06. The outer wall portion 01a is distorted in the same direction as the open direction of the covering part 01 and is deformed so as to be compressed inward. Thus, there arises a problem that, due to, for example, the restoring force of such a deformed part, a large stress is likely to be exerted on the bent portion 04 and the extension portion 06. In addition, the configuration of the related art further has a problem that a force is also likely to be exerted on a vulnerable part due to the displacement of the contact position between a body sheet metal 07 and the outer wall portion 01a, that is, due to the displacement of the position where the body sheet metal 07 receives the restoring force. Thus, in the configuration of the related art, the body sheet metal 07 may be deformed or damaged.

In contrast, in Example 1, the contact part 1c of the opening-and-closing covering part 1 comes into contact with at least the bent portion 24. Thus, as FIGS. 7D to 7F illustrate, after the contact part 1c, when the opening-and-closing covering part 1 is opened, has come into contact with the bent portion 24, the outer wall portion 1a is distorted so that the contact part 1c moves to the extension portion 23 side along the bent portion 24. Accordingly, the outer wall portion 1a is caused to deform so as to, in a way, stretch outward. Thus, compared with the configuration of the related art illustrated in FIG. 6, the stresses exerted on the extension portion 23 and the bent portion 24 are decreased. Consequently, the load may be suppressed from being exerted on the opening-and-closing covering part 1 and the hinge 2. In addition, as FIGS. 7B and 7E illustrate, the opening angle by which the opening-and-closing covering part 1 is opened beyond the open position is reduced from 23 degrees to 10 degrees. That is, compared with the configuration of the related art, the opening-and-closing covering part 1 may be stopped at a position closer to the open position that is a target position.

In particular, in Example 1, the contact part 1c comes into contact with a boundary part between the bent portion 24 and the extension portion 23 so as to straddle the boundary part. Thus, the distance traveled by the contact part 1c toward the extension portion 23 side is reduced (to nearly zero), and the distortion of the outer wall portion 1a is likely to be slight. In particular, the boundary part is bent and is a part, in the body sheet metal 21, having locally high rigidity and strength. Thus, the opening-and-closing covering part 1 may easily be stopped, and the distortion of the outer wall portion 1a may easily be reduced.

In addition, in Example 1, the extension portion 23, the bent portion 24, the second bearing portion 26, and other portions are processed by a plate-shaped member being bent. Thus, compared with the case where each portion is formed individually and assembled, the number of components may be suppressed from being increased, and this configuration may save the time and effort for assembly. Consequently, the manufacturing cost may be suppressed from being increased.

Moreover, in Example 1, the roll direction of the second bearing portion 26 is reverse to the roll direction of the second bearing portion in the configuration of the related art illustrated in FIG. 6, and the bent portion 24 passes through the space between the rotating shaft 3 and the outer wall portion 1a. Thus, compared with the form illustrated in FIG. 6, the bent portion 24 may easily be arranged near the contact part 1c, and the contact part 1c may easily come into contact with the bent portion 24 and may easily come into contact with the boundary part between the extension portion 23 and the bent portion 24.

In addition, in Example 1, the hinge 2 is made of a material more rigid than the material of the opening-and-closing covering part 1. Thus, although a problem caused by the distortion of the opening-and-closing covering part 1 is likely to arise, Example 1 may effectively address the problem.

Description of Variation 1 of Example 1

Figure 8:
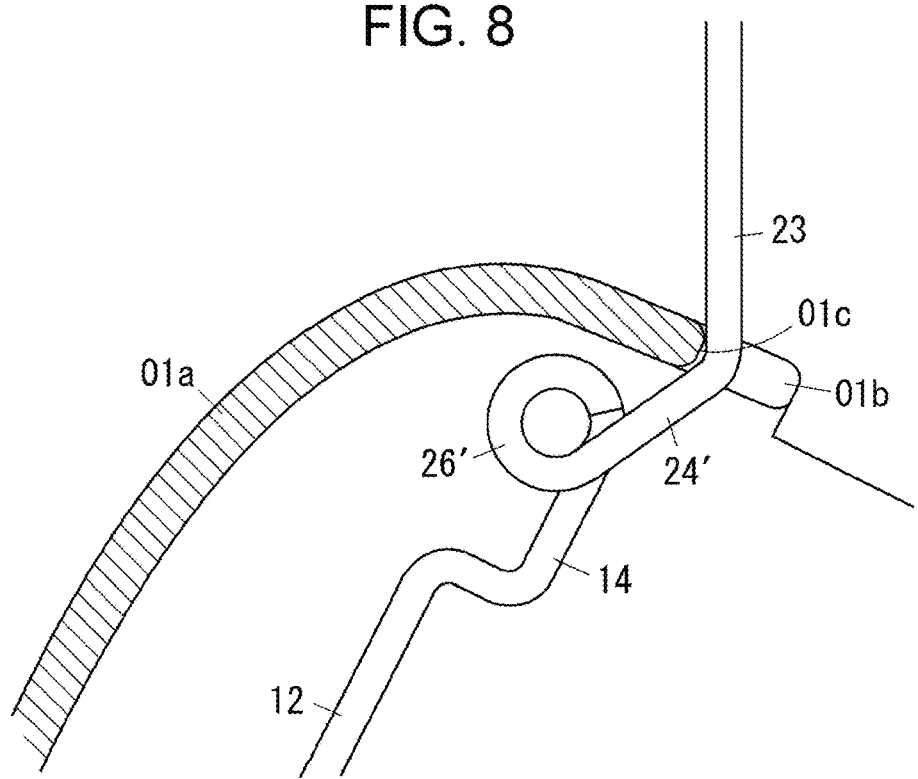
FIG. 8 illustrates Variation 1 of Example 1 and corresponds to FIG. 5.

FIG. 8 illustrates Variation 1 of Example 1 and corresponds to FIG. 5.

In FIG. 8, in Variation 1 of Example 1, the roll direction of a second bearing portion 26' is reverse to the roll direction of the second bearing portion 26 in Example 1 illustrated in FIG. 5. Note that the contact part 1c, when at the open position, is in contact with a bent portion 24', as in Example 1. Thus, the load may also be suppressed from being exerted on the opening-and-closing covering part 1 and the hinge 2 in Variation 1 illustrated in FIG. 8, as in Example 1.

Description of Variation 2 of Example 1

Figure 9:
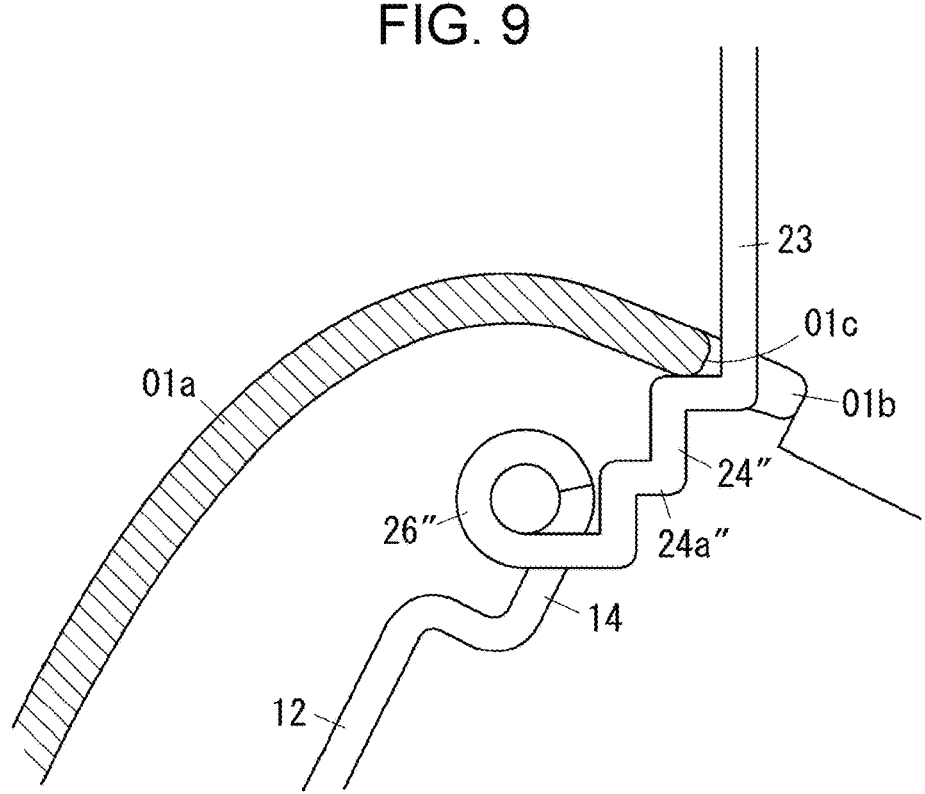
FIG. 9 illustrates Variation 2 of Example 1 and corresponds to FIG. 5.

FIG. 9 illustrates Variation 2 of Example 1 and corresponds to FIG. 5.

In FIG. 9, in Variation 2 of Example 1, a bent portion 24" has a step-shaped part 24*a*". Due to the shape of the step-shaped part 24*a*", it may be possible to improve the rigidity of the bent portion 24" in Variation 2 illustrated in FIG. 9. In addition, it is also possible to stop the opening-and-closing covering part 1 by the contact part 1*c* coming into contact with a step portion (a corner portion) of the step-shaped part 24*a*" without the contact part 1*c* moving to the boundary part between the bent portion 24" and the extension portion 23.

Modifications

Although the example of the present disclosure has so far been described in detail, an aspect of the present disclosure is not limited to the above-described example, and various modifications are possible without departing from the spirit of the present disclosure described in the claims. Modifications H01 to H04 regarding the present disclosure are described below as examples.

(H01) Although the copier U, which is an example of an image forming apparatus, is described as an example, an aspect of the present disclosure is not limited thereto and is applicable to, for example, a fax or a multifunctional machine having plural functions of apparatuses such as a fax, a printer, and a copier. In addition, an aspect of the present disclosure is not limited to a multi-color developable image forming apparatus and may be a single-color, so-called monochrome image forming apparatus. Moreover, an aspect of the present disclosure is not limited to an opening-and-closing covering part provided at the part where a toner cartridge is replaced, and an aspect of the present disclosure is applicable to any opening-and-closing covering part of an image forming apparatus such as a door that opens and closes a transport path of a paper sheet. In addition, an aspect of the present disclosure is not limited to an image forming apparatus having the opening-and-closing covering part 1 and is applicable to any configuration (an opening and closing device) such as an electronic device, a household electrical appliance, or a piece of furniture, each of which has a door that is opened and closed.

(H02) The specific numerical values given as examples in the above-described example may appropriately be changed according to a change in design and specifications. For example, the angle that the extension portion 23 forms with the bent portion 24 is not limited to 90 degrees and may be an acute angle or may alternatively be an obtuse angle according to the open position.

(H03) Although the case where the covering-part sheet metal 11 and the body sheet metal 21 are formed by a plate-shaped member being processed, that is, for example, being bent is described as an example in the above-described example, an aspect of the present disclosure is not limited thereto. For example, each portion may be formed individually and may be, for example, assembled by screwing or welded.

(H04) Although the hinge 2 may be made of a material more rigid than the material of the opening-and-closing covering part 1 in the above-described example, an aspect of the present disclosure is not limited thereto. The hinge 2 and the opening-and-closing covering part 1 may be made of the same material, or the material of the opening-and-closing covering part 1 may be more rigid than the material of the hinge 2.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
    a body of the image forming apparatus;
    an opening and closing unit that is supported by the body of the image forming apparatus so as to rotate relative to the body of the image forming apparatus and that opens and closes an inside of the body of the image forming apparatus, the opening and closing unit having a rotating shaft;
    a first coupling unit that has a first tube portion having a tube shape and having an inside through which the rotating shaft of the opening and closing unit passes, the first coupling unit being supported by the opening and closing unit; and
    a second coupling unit that has an extension portion supported by the body of the image forming apparatus and extending toward the first coupling unit, a bent portion having a first end portion that is connected to an end portion of the extension portion and being formed to be bent relative to an extension direction of the extension portion and to extend toward the rotating shaft, and a second tube portion disposed beside a second end portion of the bent portion and having an inside through which the rotating shaft of the opening and closing unit passes, the second coupling unit being rotatably coupled to the first coupling unit, wherein:
    when the opening and closing unit has been moved to an open position where the opening and closing unit opens the inside of the body of the image forming apparatus, a contact part at which the opening and closing unit is to be in contact with the second coupling unit is in contact with the bent portion,
    wherein the bent portion has a step-shaped part.

2. The image forming apparatus according to claim 1, wherein:
    the contact part at which the opening and closing unit is to be in contact with the second coupling unit comes into contact with a boundary part between the bent portion and the extension portion.

3. The image forming apparatus according to claim 2, wherein:
    the contact part at which the opening and closing unit is to be in contact with the second coupling unit comes into contact with the bent portion and the extension portion in a straddling manner.

4. The image forming apparatus according to claim 3, wherein:
    the extension portion, the bent portion, and the second tube portion are processed by a plate-shaped member being bent.

5. The image forming apparatus according to claim 4, wherein:
the second tube portion is processed by the plate-shaped member being bent to be rolled and is bent, from a part beside the bent portion toward a distal end, in a roll direction parallel to a direction where the opening and closing unit is closed relative to the body of the image forming apparatus.

6. The image forming apparatus according to claim 2, wherein:
the extension portion, the bent portion, and the second tube portion are processed by a plate-shaped member being bent.

7. The image forming apparatus according to claim 6, wherein:
the second tube portion is processed by the plate-shaped member being bent to be rolled and is bent, from a part beside the bent portion toward a distal end, in a roll direction parallel to a direction where the opening and closing unit is closed relative to the body of the image forming apparatus.

8. The image forming apparatus according to claim 1, wherein:
the extension portion, the bent portion, and the second tube portion are processed by a plate-shaped member being bent.

9. The image forming apparatus according to claim 8, wherein:
the second tube portion is processed by the plate-shaped member being bent to be rolled and is bent, from a part beside the bent portion toward a distal end, in a roll direction parallel to a direction where the opening and closing unit is closed relative to the body of the image forming apparatus.

10. The image forming apparatus according to claim 8, wherein:
the second tube portion is processed by the plate-shaped member being bent to be rolled and is bent, from a part beside the bent portion toward a distal end, in a roll direction reverse to a direction where the bent portion is bent relative to the extension portion.

11. The image forming apparatus according to claim 8, wherein:
the bent portion extends while passing through a space between the rotating shaft and the opening and closing unit.

12. The image forming apparatus according to claim 1, wherein:
the second coupling unit is made of a material more rigid than a material of the opening and closing unit.

13. An opening and closing device comprising:
an opening and closing target unit;
an opening and closing unit that is supported by the opening and closing target unit so as to rotate relative to the opening and closing target unit and that opens and closes an inside of the opening and closing target unit, the opening and closing unit having a rotating shaft;
a first coupling unit that has a first tube portion having a tube shape and having an inside through which the rotating shaft of the opening and closing unit passes, the first coupling unit being supported by the opening and closing unit; and
a second coupling unit that has an extension portion supported by the opening and closing target unit and extending toward the first coupling unit, a bent portion having a first end portion that is connected to an end portion of the extension portion and being formed to be bent relative to an extension direction of the extension portion and to extend toward the rotating shaft, and a second tube portion disposed beside a second end portion of the bent portion and having an inside through which the rotating shaft of the opening and closing unit passes, the second coupling unit being rotatably coupled to the first coupling unit, wherein:
when the opening and closing unit has been moved to an open position where the opening and closing unit opens the inside of the opening and closing target unit, a contact part at which the opening and closing unit is to be in contact with the second coupling unit is in contact with the bent portion,
wherein the bent portion has a step-shaped part.

\* \* \* \* \*